United States Patent [19]

Fournier

[11] Patent Number: 4,482,859
[45] Date of Patent: Nov. 13, 1984

[54] OBJECT DISPLACEMENT SENSOR AND DEVICE FOR MEASURING THE ROTATION SPEED AND VIBRATION FREQUENCY OF A ROTOR

[75] Inventor: Jacques M. A. Fournier, Chatillon, France

[73] Assignee: S.N.E.C.M.A., Paris, France

[21] Appl. No.: 378,346

[22] Filed: May 14, 1982

[30] Foreign Application Priority Data

May 15, 1981 [FR] France ............... 81 09681

[51] Int. Cl.³ ........................................... G01R 27/26
[52] U.S. Cl. ........................ 324/61 QS; 324/166; 324/168; 73/579; 73/613
[58] Field of Search .......... 324/61 QS, 166, 168; 73/579, 613

[56] References Cited

U.S. PATENT DOCUMENTS

| | | | |
|---|---|---|---|
| 3,205,713 | 9/1965 | Thomas | 73/462 |
| 3,386,031 | 5/1968 | Able et al. | 324/61 QS |
| 3,428,889 | 2/1969 | Mayer | 324/61 QS |
| 4,021,681 | 5/1977 | Miesterfeld | 307/233 A |

FOREIGN PATENT DOCUMENTS

| | | | |
|---|---|---|---|
| 1417215 | 10/1965 | France. | |
| 2061983 | 6/1971 | France. | |
| 0122158 | 9/1980 | Japan | 324/166 |
| 1053389 | 12/1966 | United Kingdom. | |
| 0667895 | 1/1979 | U.S.S.R. | 324/61 QS |
| 0794520 | 1/1981 | U.S.S.R. | 324/166 |

Primary Examiner—Stanley T. Krawczewicz
Attorney, Agent, or Firm—Oblon, Fisher, Spivak, McClelland & Maier

[57] ABSTRACT

An object displacement sensor specifically adapted for high speed counting of passing nonmagnetic objects is disclosed which has a resonant circuit made up of at least one inductive element 2 and a condensor whose one plate consists of a conductive surface 3 and whose other plate is successively formed by each object 4 passing close to this surface 3. The resonant circuit is connected to a first oscillator 6 which determines the functioning frequency such that the signal issued from the first oscillator 6 is modulated in frequency to the rhythm of the passage of the objects 4.

9 Claims, 3 Drawing Figures

OBJECT DISPLACEMENT SENSOR AND DEVICE FOR MEASURING THE ROTATION SPEED AND VIBRATION FREQUENCY OF A ROTOR

BACKGROUND OF THE INVENTION

1. Field of the invention

The present invention relates to an object displacement sensor adapted for high speed counting of passing nonmagnetic objects, regardless of their conductivity.

2. Description of the Prior Art

Sensors described in the prior art, designed to count metallic objects passing by at high speed, use either the magnetic properties of the material composing the objects or their electrical conductivity. Effectively, a mass of ferro-magnetic material passing close by a conductive wire coil with a metal magnet core causes a variation in the magnetic induction in the core and thus a current impulse along the coil. This impulse is then amplified, filtered and put in a form in which it can be counted by logical counting circuits. The electrical conductivity is, for its part, used to exploit the variation in the induction coil which provides the Foucault current inducted in the conductive metal of which the objects are made. The sensitivity of this system is directly associated with the conductivity of the metal.

Sensors of the type just described have many disadvantages which limit their use. In effect, their use requires the presence of a ferro-magnetic element in the counted objects or a weak electrical resistance. Furthermore, in the presence of radio-electric noise more particularly high frequency noise, the conductive wire coil of the sensor generates a current with a noise level frequency high enough to impede precise counting of objects. This radio-electric noise effect is particularly important in structures such as aircraft turbine reactors which it is necessary to measure the rotor speed with precision.

SUMMARY OF THE INVENTION

The present invention has as its object an object displacement sensor which alleviates these disadvantages. To this end the object displacement sensor conforming to this invention has a resonant circuit, composed of at least one induction coil element, and a condensor of which one of the plates is a conductive surface and the other plate is successively formed by each object passing close to this surface. The resonant circuit is connected to a first oscillator which determines the functioning frequency in such a manner that the signal issuing from this first oscillator is modulated in frequency with the rhythm of the passage of the objects close to the sensor.

According to a preferred embodiment, in the displacement sensor conforming to the invention the frequency modulated signal emitted by the first oscillator is demodulated by means of a frequency discriminator having a second oscillator controlled by a phase loop which has a first multiplier circuit and a first integrator. The reference signal applied to one of the inputs of the multiplier circuit is the frequency modulated signal emitted by the first oscillator.

According to another characteristic of the invention the output signal of the first integrator is connected to one input of a second multiplier whose output is connected to the second input of the second multiplier by means of a second integrator and a third oscillator mounted in series.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
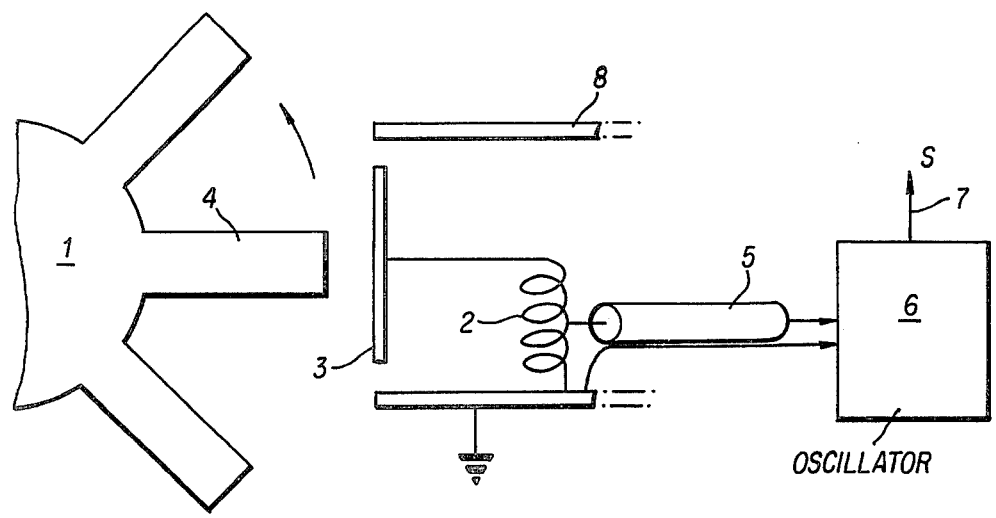
FIG. 1 is a diagram which illustrates the function of an object displacement sensor according to the invention.

Referring now to the drawings, wherein like reference numerals designate identical or corresponding parts throughout the several views, and more particularly to FIG. 1 thereof, which shows an example of a sensor in accordance with the invention used to measure the rotation speed of the rotor of a turbine 1. This sensor comprises a resonant circuit made up of an induction coil element 2 and a condensor, one of whose plates consists of a conductive surface 3 and the other plate consists successively of each of the blades 4 of the turbine rotor 1 passing close to this conductive surface 3. The resonant circuit is connected by a coaxial cable 5 to an oscillator 6 whose functional frequency is determined by the value of the induction coil element, the capacity of the various parasitic condensors and the capacity of the condensor, one part of which is formed by the metallic surface 3 incorporated into the sensor and another part of which is formed by the metallic blade 4 closest to the sensor. Thus, the conductive objects passing close to the sensor, more specifically, the blades 4 in the example of the turbine 1 rotor, are connected electrically to the oscillator 6. When the rotor of the turbine 1 rotates at a constant speed, the metallic blades 4 pass close to the metallic surface of the sensor.

The capacity value of the condensor formed by this metallic surface 3 and the surface of the blades 4 will thus vary according to a periodic relationship whose period is equal to the length of time that takes each blade to pass the sensor. Thus, the frequency of the current S available at the output terminal 7 of the oscillator 6 will vary accordingly as a function of time according to the same relationship. The maximum frequency of this oscillator, in the absence of blades 4, is defined by the value of the induction coil element situated in the sensor and the capacity of the various condensors inherent in the form of the sensor. In contrast, the minimum frequency of the oscillator is obtained when the capacity of the condensor is maximum, i.e., when a blade 4 is facing the metallic surface 3. The induction coil element 2 is placed inside a metal casing 8 at one extremity of which the metallic surface 3 is located.

Figure 2:
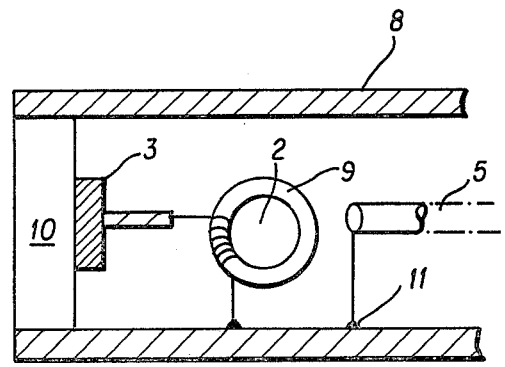
FIG. 2 is an embodiment of the resonant circuit used to put the invention in operation.

FIG. 2 shows a particular disposition of the elements inside a metal casing 8. In this example the inductive element 2 comprises an O-ring coil whose core 9 may be magnetic. Such a coil is less sensitive to the radio-electric environment. In addition to the elements already described, this sensor comprises a plate 10 made of a dielectric material which protects the inside of the sensor against outside environmental conditions (chemical compositions, climatic conditions, etc. . . .) which must be eliminated in order to accurately determine the rotation speed of a turbine. Furthermore, the dielectric constant of the plate 10 increases the capacity of the condensor formed by the conductive surface 3 and the conductive objects which pass before it, thus augmenting the sensitivity of the sensor. The contact points 11 with the body of the metal casing 8 are provided as a ground. According to one variation of the embodiment, the casing 8 can be nonconductive and the contact points 11 would, thus, be situated on the exterior of the coaxial cable 5.

Figure 3:
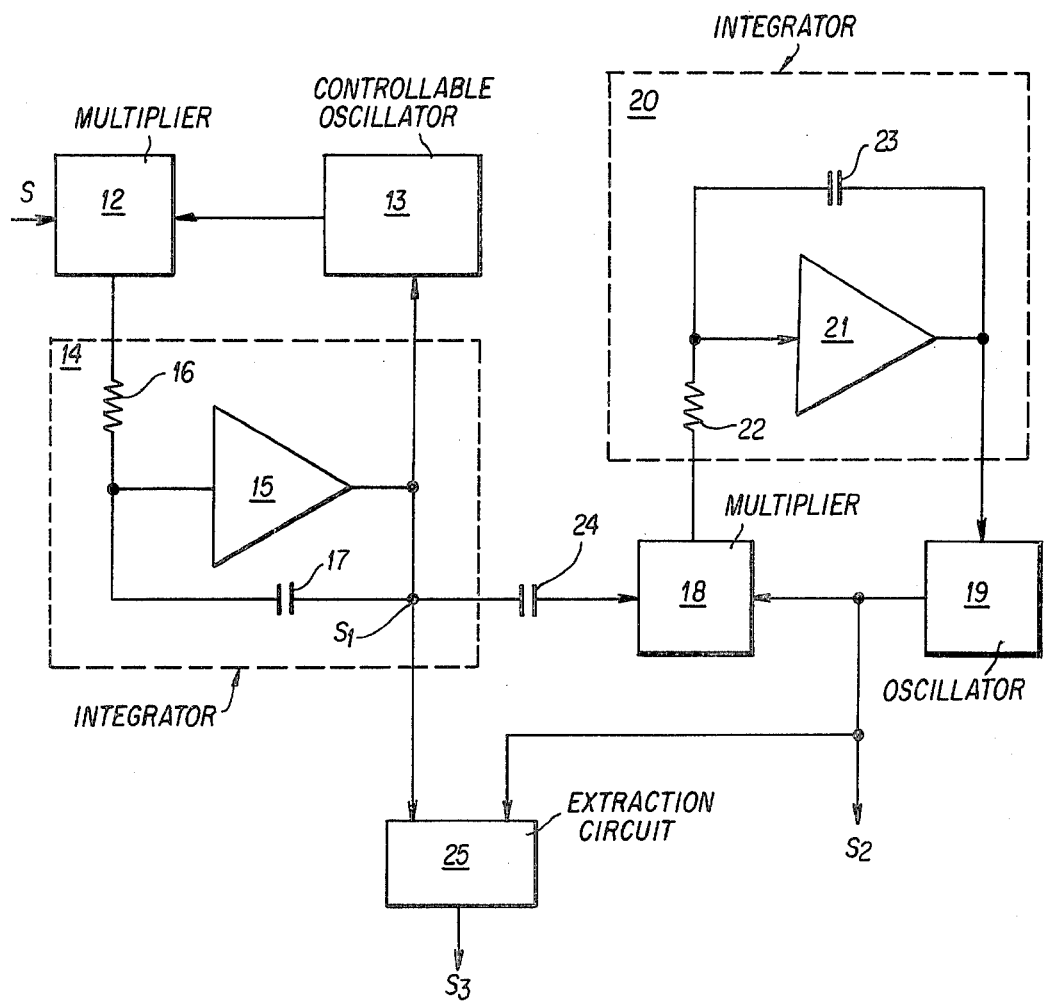
FIG. 3 is a block diagram showing a preferred embodiment for exploiting the frequency modulated signal used in a sensor according to the invention.

FIG. 3 shows a preferred embodiment of the circuits used to process the signal S which is produced by the oscillator 6 and modulated in frequency in accordance with the rhythm at which the conductive objects file past close to the sensor.

A first circuit is made up of a multiplier 12, a controllable oscillator 13 and an integrator 14. The integrator 14 is composed, in a conventional manner, of an amplifier 15, a resistor 16 with a value of R1 and a condensor 17 with a value of C1. The product R1C1 determines the time constant of the integrator 14.

The multiplier 12 receives the signal S at one of its inputs and the signal issued by the controllable oscillator 13 at another input. This oscillator 13 is set in frequency with the signal S by means of a conventionally phased loop of the multiplier 12 and of the integrator 14 which is connected between the output of the multiplier 12 and the frequency control input of the controllable oscillator 13. Thus, the control signal S1 of the oscillator 13 at the frequency of signal S is a periodic signal which corresponds exactly with the modulation frequency of the oscillator 6. The first circuit formed by the multiplier 12, the oscillator 13 and the integrator 14 thus constitutes a frequency discriminator with a phase loop.

It is evident that the periodic signal S1 is not only made up of a principal periodic signal which represents the passage of the blades 4 past the sensor, but also various consecutive secondary periodic signals, for example, those representing vibrations or imbalance. Thus, it may be desirable to isolate, within the S1 signal, the periodic signal that effectively corresponds to the passage of the blades. To this end, a second circuit is used, comprising, as in the first, a phase loop made up of a multiplier 18, a controllable oscillator 19, and an integrator 20. This integrator has an amplifier 21, a resistor 22, with a value of R2, and a condensor 23 with a value of C2. A connecting condensor 24 makes it possible to eliminate the continuous component from signal S1. Thus, the S2 signal, available at the output of the controllable oscillator 19, is an alternating signal whose frequency is controlled by the frequency of the principal band of the spectrum of the S1 signal. This second circuit has a band-pass filter, centered on the signal frequency being extracted, which has a band-pass defined by the value of the product R2C2.

The frequency of the alternating signal S2 thus makes it possible to determine with great precision the rotation speed of the rotor 1.

However, it is also possible to use the device according to the invention to determine the rotor vibration frequencies. In this case, it is the secondary periodic signals contained in S1 that are interesting. These secondary periodic signals can be made evident by determining the difference S1−S2. This difference can be obtained with the aid of an extraction circuit 25 which provides at its output a periodic signal S3 which represents the low frequency components of the corresponding modulation signal, for example, for a turbine, the vibrations of the blades. According to one embodiment, the extraction circuit 25 can be made up of a mixer which makes it possible to obtain the low frequency components in the difference between the frequency spectra of the S1 and S2 signals.

A particular advantage of the device according to the invention is the possibility of choosing the oscillator frequency, thus allowing its placement in a frequency zone with a minimum of radio-electric noise. In addition, the extraction device allows for a superior frequency modulation procedure having increased immunity against parasitic influences.

Another advantage of the device according to the invention is its excellent operation in the presence of objects made of metals whose resistivity is high.

The device according to the invention is also sensitive to very weak frequency variations. This makes it possible to measure very slow rotation speeds.

The device according to the invention finds particularly interesting application in the area of turbine engines. It makes it possible, in effect, to measure the rotor rotation speed, notably the turbine impeller, as well as the vibration modes of the various rotor elements, specifically the blades.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An object displacement sensor comprising:
a resonant circuit having at least one inductive element and a condensor with one of the plates of said condensor being made up of a conductive surface and the other plate being successively formed by each one of a plurality of objects passing close to said surface;
a first oscillator connected to said resonant circuit for determining a functioning frequency such that the signal issued from said first oscillator is modulated by the frequency with which said objects pass said surface;
frequency discriminator means comprising a second oscillator controlled by a phase loop consisting of a first multiplier circuit and a first integrator with the reference input of said first multiplier circuit being supplied with the frequency modulated signal issued from said first oscillator in order to provide a demodulation of said frequency modulation signal issued by said first oscillator.

2. An object displacement sensor according to claim 1, wherein the output signal of the first integrator is connected to an input of a second multiplier whose output is connected to the second input of said multiplier by means of a second integrator and a third oscillator connected in series.

3. An object displacement sensor according to one of the claims 1 or 2, wherein said inductive element 2 is made up of a coil with a conducting wire whose one end is electrically connected to said conductive surface 3 which constitutes one of the plates of the condensor.

4. An object displacement sensor according to claim 3, wherein the inductive element 2 consists of a conductive wire coil on a magnetic O-ring core 9.

5. An object displacement sensor according to one of the claims 1 or 2, wherein the resonant circuit is spaced from said first oscillator 6 to which it is connected by a coaxial cable 5.

6. An object displacement sensor according to one of the claims 1 or 2, wherein the conductive surface and the inductive element are separated from the passing objects by means of a dielectric body 10.

7. An object displacement sensor according to claim 2 wherein a circuit 25 determines the difference between the output signal of the first integrator 14 and the output signal of the third output oscillator 19.

8. The object displacement sensor according to claim 1 wherein said sensor is used to measure the rotation speed of a rotor of a turbine engine impeller and wherein said functioning frequency is used to count the successive passages of the blades of said rotor.

9. The object displacement sensor according to claim 7 wherein said sensor is used to measure the vibration frequency of a turbine engine impeller and wherein said circuit which determines the difference between the output signal of said first integrator and the output signal of said third output oscillator is a differentiator which is used to isolate the periodic signal characteristics of vibration.

* * * * *